United States Patent [19]

Palmer

[11] Patent Number: 4,823,379

[45] Date of Patent: Apr. 18, 1989

[54] TELEPHONE RINGER

[75] Inventor: Jerry D. Palmer, Corinth, Miss.

[73] Assignee: Alcatel Business Systems, Corinth, Miss.

[21] Appl. No.: 150,788

[22] Filed: Jan. 29, 1988

[51] Int. Cl.[4] .......... H04M 1/02

[52] U.S. Cl. .......... 379/373; 340/397; 340/392

[58] Field of Search .......... 340/392, 396, 395, 397, 340/398, 399, 400, 401, 402; 379/373, 375

[56] References Cited

U.S. PATENT DOCUMENTS

| | | | |
|---|---|---|---|
| 1,009,345 | 11/1911 | Suavé | 340/392 |
| 2,683,871 | 7/1954 | Meleski | 340/396 |
| 4,097,862 | 6/1978 | Brionne | 340/392 X |

*Primary Examiner*—James L. Dwyer

*Attorney, Agent, or Firm*—Peter C. Van Der Sluys

[57] ABSTRACT

A magnetically controlled steel ball armature functions as a clapper to strike a gong. A positionally adjustable permanent magnet polarizes the ball and positions it relative to the gong. An electromagnet modulates the magnetic field of the permanent magnet to drive the ball strikingly against the gong. Bell tap is suppressed by adjusting the position of the permanent magnet relative to the gong.

15 Claims, 1 Drawing Sheet

FIG. 2
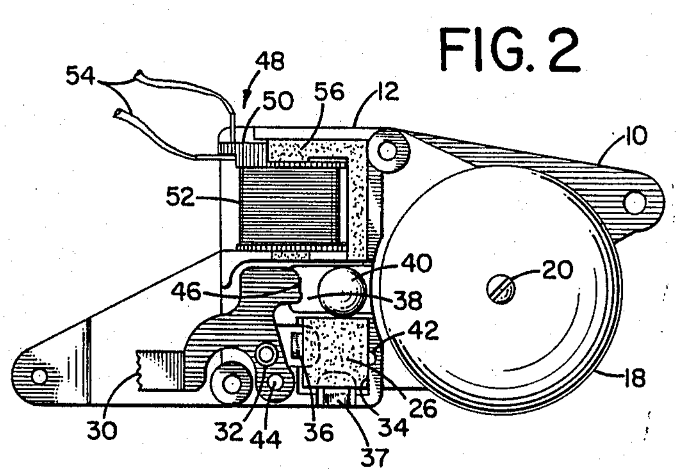
FIG. 5
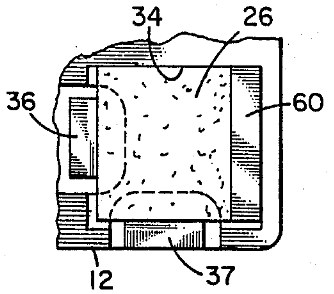
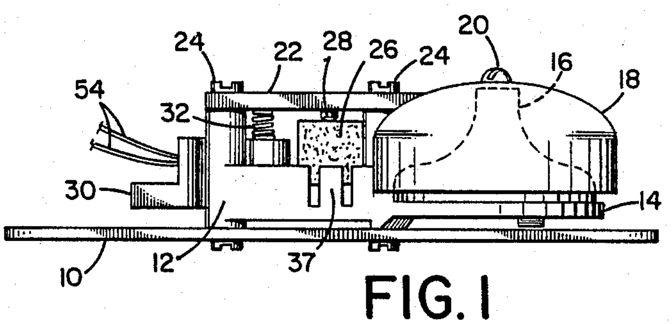
FIG. 1
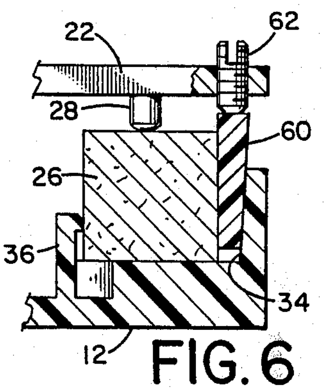
FIG. 6
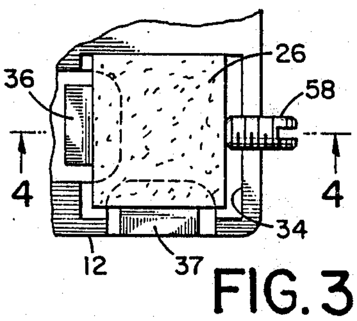
FIG. 3
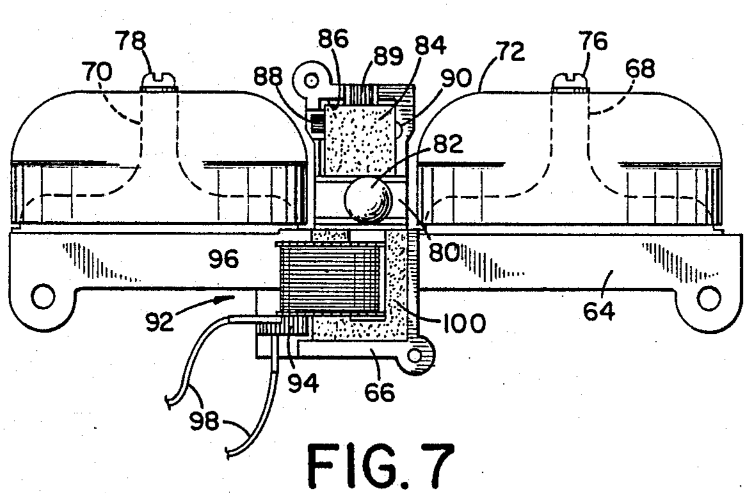
FIG. 7
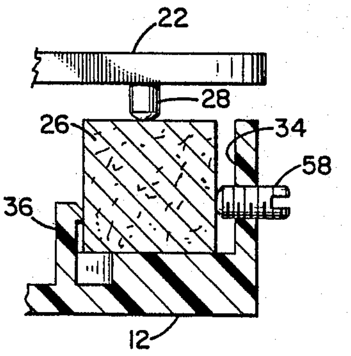
FIG. 4

TELEPHONE RINGER

BACKGROUND OF THE INVENTION

1. Field of the Invention

The present invention relates to a telephone ringer and more particularly to a telephone ringer wherein the clapper is a magnetically controlled steel ball freely mounted to be driven against a gong. The ball is magnetically biased to provide polarity independent bell tap suppression.

2. Description of the Prior Art

Heretofore telephone ringers have been provided as assemblies including one or two gongs, a clapper mounted on the end of a pivotably mounted clapper arm, and an electromagnet for driving the clapper. Typical ringers are shown in U.S. Pat. Nos. 2,590,500; 2,692,380; and 4,054,870. Characteristically the clappers have a significant mass and the arms are of considerable length. Due to the lever arm effect a rather large and powerful electromagnet was required. Accordingly, the ringers are inherently large, complex mechanical assemblies having excessive weight. The cost of the required components and the labor intensive assembly contributed significantly to the expense of a telephone subset. A need existed in the art for a smaller and less expensive telephone ringer.

A mechanically simple, but large and heavy electromagnetic signaling instrument, developed by S. H. Sauve is shown in U.S. Pat. No. 1,009,345. FIG. 5 of the patent shows a double gong ringing device having a ball armature mounted in an opening formed in a permanent magnet disposed between two gongs. A pair of coils are energized so that the ball vibrates between the two gongs. The patent does not disclose how the coils are energized; however, it is presumed that using modern technology an AC signal would be used. For unknown reasons the Suave device was never improved for use in modern telephony.

A problem that has consistently plagued the designers of telephone ringers is that of bell tap or false ring. False ring occurs when multiple subsets are connected to the same line pair and one subset is dialed. The dial pulses generated by one subset inadvertently pass to the ringer of another subset causing a false ringing of the other subset.

Telephone ringers are connected in parallel with the telephone subset to a line pair. A capacitor is connected in series with the ringer to block DC current while freely passing an AC ringing signal. Ringers must be adjusted to have sufficient sensitivity to operate at frequencies between 20 and 30 Hz with minimum voltages of 45 volts RMS at 20 Hz and 65 volts RMS at 30 Hz. Thus, the ringer must have a prescribed minimum sensitivity.

Dial pulses generate unipolar voltage spikes up to approximately 470 volts. These voltage spikes pass through the blocking capacitor of the ringer and cause the clapper arm to move in one direction resulting in bell tap. In order to overcome the difficulty of bell tap, most modern ringers provide a bias spring on the clapper arm to restrain the movement of the arm in the direction that would result from the unipolar dial pulse spikes.

While the above solution for bell tap has been moderately successful, recent changes in the telephone industry have resulted in a new rash of bell tap complaints. Many consumers are now buying and installing their own telephone subsets. Installing a telephone subset requires the connection of two wires, a red and a green wire, to the line pair. If these wires are not connected properly, bell tap will not only occur, but will be acerbated by the fact that the bias spring urges the arm in the direction of motion caused by the dial pulses. Thus, the use of a bias spring is no longer a satisfactory solution to the bell tap problem.

The Sauve patent did not address the bell tap problem because dial type systems had not yet been invented at the time of the Sauve patent. It appears, however, that the Sauve device would be subject to bell tap if installed in a modern telephone system.

SUMMARY OF THE INVENTION

The primary object of the present invention is to provide a telephone ringer that is less expensive and smaller than those heretofore provided.

Another objective of the present invention is to provide a lighter weight telephone ringer.

Another objective of the present invention is to provide a mechanically less complex telephone ringer.

Another objective of the present invention is to provide a telephone ringer having means to reduce occurrences of bell tap independent of the subset's connection to the line pair.

The above objectives have been achieved using a magnetically controlled steel ball armature as the clapper for a telephone ringer. The steel ball is disposed adjacent a permanent magnet which is used to polarize the ball, position the ball relative to a gong and provide a fixed bias for a magnetic field. An electromagnet driven by an alternating ringing voltage produces an alternating magnetic field which modulates the magnetic field of the permanent magnet and drives the ball in alternating directions for striking one or two gongs.

Bell tap is suppressed by providing a means to adjust the position of the permanent magnet relative to the direction of travel of the ball so that the ball may be properly positioned to prevent dial pulses from driving the ball against the gongs.

The unique structure of the present invention eliminates the need for the clapper arm, the large electromagnet and the bias spring. The size of the electromagnet can be substantially reduced since only a small ball must be driven. Thus, the mechanical structure of the present invention is greatly simplified, the size and weight reduced along with a significant reduction in cost.

DESCRIPTION OF THE DRAWINGS

FIG. 1 shows a front view of a single gong telephone ringer constructed in accordance with the present invention.

FIG. 2 shows a top view of the telephone ringer of FIG. 1 with the cover removed.

FIG. 3 is a top view of a portion of the ringer of FIG. 1 showing an alternate means for adjusting the permanent magnet.

FIG. 4 is a partial sectional view taken along line 4—4 of FIG. 3.

FIG. 5 shows an alternate embodiment of a means for adjusting the permanent magnet.

FIG. 6 shows a sectional view of the embodiment of FIG. 5.

FIG. 7 is a front view of a double gong telephone ringer shown with the cover removed.

DETAILED DESCRIPTION OF THE PREFERRED EMBODIMENT

Referring to FIG. 1 there is shown a single gong ringer constructed in accordance with the present invention. The ringer includes a metallic base plate 10 having mounted thereto a plastic mounting base 12. The mounting base includes an extended cantilevered portion 14 having an upwardly extending boss 16 formed thereon. A gong 18 is mounted to said boss by a screw 20. Screw 20 extends through an opening formed in the dome of the gong 18, said opening being slightly off centered so that the gong may be rotated thereby adjusting the distance from the periphery of the gong to the main portion of the mounting base.

A cover 22 is positioned on the mounting base and is attached thereto via screws 24. A permanent magnet 26 is nested in the mounting base. A downwardly extending post 28 is formed on the inside of cover 22 for engaging magnet 26 when the cover is securely fastened. A volume control lever 30 is mounted within the mounting base 12 and extends outwardly therefrom for ease of adjustment. A spring 32 is disposed between the cover 22 and the volume control lever 30 for urging the lever into adjustment detents formed in the mounting base 12, but now shown in the drawing.

Referring to FIG. 2 there is shown the single gong ringer of FIG. 1 with the cover 22 removed to more clearly show the positioning of the components in the mounting base 12. Magnet 26 is disposed within an enlarged rectangular nest 34 formed in mounting base 12. Mounting base 12 has formed therein, along two adjacent walls of nest 34, two upwardly extending spring arms 36 and 37 which resiliently engage the magnet 26 and urge the magnet against the opposite walls of nest 34. A concave track 38 is formed in mounting base 12 for receiving a steel ball 40 which functions as an armature and moves along the track 38. Ball 40 will contact magnet 26 and assume a position along track 38 depending upon the location of the permanent magnet 26 within the nest 34. Nest 34 is sized and configured to allow a degree of lateral motion of the magnet 26 in a direction parallel to the travel of ball 40. A notch 42 is formed in one wall of the nest 34 to facilitate the entry of a pointed adjustment tool which may be used to urge the magnet in a direction against the spring member 36.

As shown in FIG. 2 the volume control lever 30 is pivotly mounted on a post 44 formed on the mounting base 12. The volume control lever 30 includes an abutment portion 46 which overlays track 38 and controls the travel of ball 40 depending upon the position of the volume control lever.

An electromagnet 48 is nested in the mounting base 12 on a side of the ball 40 opposite the permanent magnet 26. Electromagnet 48 includes a bobbin 50, a wire coil 52, connecting leads 54 and a ferromagnetic core 56 formed of U-shaped laminations. The connecting leads 54 are provided to receive a telephone ring signal.

The components of the electromagnetic circuit must be selected as to size and composition so that the natural frequency of oscillation of the clapper ball compliments the normal telephone ringing frequencies of 20–30 Hz. The distance the ball must travel and the mass of the ball significantly influences its natural frequency of oscillation. The ball is formed of type 440 stainless steel and has a diameter of approximately 0.312 inch. The ball has a Rockwell C hardness of 60–63. The permanent magnet 26 must be magnetized so that the axis between its north and south pole is perpendicular to the direction of travel of ball 40. The permanent magnet is made of Ceramic 5, as per M.M.P.A. 0100-75 standard specification for permanent magnet material having the following minimum magnetic properties: peak energy product (B ++Max.) shall be $3.15\times10^6$ *l* ($80.01\times254.0^6$) at a slope of 1.0 (25.40); Min. Br 3700 gauss; Min. ++C coercive force 2200 oersteds; and at an operating slope of 10.0 (254.0) flux density shall be a Min. of 3350 gauss. The surface of the permanent magnet 26 which is in juxtaposition with ball 40 shall have a machine surface finish of 63 microinch. This finish is important since the ball will be attracted to the magnet and will essentially roll along the magnet's surface.

It is contemplated that the ball 40 could be replaced with a cylinder having the proper mass which would also be able to roll on the surface of the permanent magnet 26.

The electromagnet 48 is formed of U-shaped laminations, such as lamination M-6 supplied by Armco, each being approximately 0.014 inch thick. The lamination stack shall have a thickness of approximately 0.258 inch. The coil winding 52 shall be formed of 44 AWG (0.0022) enamaled wire and shall have 22,500 turns.

The ringer is assembled as shown in FIGS. 1 and 2 with the permanent magnet 26 establishing a magnetic pole in the ball 40 and also positioning the ball at a selected point in the ball track 38. Upon application of a ringing voltage, the electromagnet will alternately produce north and south magnetic poles at the ends of the laminated U-core causing the steel ball armature to be simultaneously repelled and attracted by said poles thereby driving the ball in a particular direction. Upon a change in polarity of the ringing signal, the ball will be driven in the opposite direction. Each time the ball 40 is driven by the electromagnet 48, it is forced beyond its position of magnetic stability established by the permanent magnet 26 and either strikes the gong 18 or the abutment surface 46 of the volume control lever 30. After striking the gong 18 or the abutment surface 48, the ball immediately rebounds because of the combined mechanical rebounding force and attraction to the point of magnetic stability established by the permanent magnet 26. During this rebounding the alternating voltage in the coil reverses polarity and the ball is driven in the opposite direction.

The volume control lever 30 restricts the motion of the ball thereby shortening it's path of travel and reducing the ball's acceleration. The reduced acceleration reduces the striking force against the gong resulting in a lower volume ringing signal. In the most extreme position of the volume control lever, ball motion is totally restricted and the only sound that will be heard is a buzz.

After assembly of the ringer its sensitivity must be properly adjusted. During this adjustment the cover 22 is loosened slightly to allow movement between magnet 26 and the downwardly depending post 28. The first step in adjusting the ringer sensitivity is to energize the ringer with the minimum ring signal of 45 volts RMS at 20 Hz. With the ring signal applied the gong 18 is turned on the mounting boss 16 so that a specified loudness at the minimum ring signal is achieved. A synthesized dial pulse signal is then applied to the determine if bell tap is experienced. If bell tap is a problem the magnet position is then adjusted in a direction parallel to the ball travel by inserting a pointed tool into notch 42 to urge the magnet 26 in a direction away from the gong 18. When a satisfactory position is achieved and bell tap is not experienced, screws 24 are tightened so that the depending post 28 engages magnet 26 to at least temporarily hold the magnet in place. The magnet is then permanently held in position through the application of an adhesive such as LOCTITE which will prevent accidental movement of the magnet should the ringer be dropped and experience a mechanical shock.

While the above-described method of adjusting the magnet position has proved satisfactory, more sophisticated methods could be used if desired. FIGS. 3 and 4 show an alternate embodiment wherein the permanent magnet 26 may be adjusted through the use of a set screw 58. The set screw can be used to urge the permanent magnet 26 against spring member 36 to provide the desired positional adjustment.

In FIGS. 5 and 6 a wedge 60 is disposed between magnet 26 and a sloped wall of nest 34. The wedge 60 is engaged by a set screw 62 which may be used to position the wedge and thereby move the magnet to the desired position.

Referring to FIG. 7 there is shown a double gong ringer which operates using the above-described principles and has electromagnetic components similar to those used in the single gong ringer. The ringer is shown with the cover removed so that the components may be more clearly illustrated. For the purposes of simplicity a volume control lever has not been included in FIG. 7; however, a wedge shaped arm could be provided for extending into the space between the ball and one of the gongs. The ball travel would be limited by the degree of insertion of the wedge.

A base member 64 has formed integrally therewith a mounting base 66 for the ringer motor and two upstanding bosses 68 and 70. Two dissimilar gongs 72 and 74 known as the B—B and A—A gongs respectively are mounted to the bosses 68 and 70 using mounting screws 76 and 78. As previously mentioned the openings in the gongs through which the screws 66 and 78 are inserted are formed off center so that the gongs may be turned for positioning purposes.

The mounting base 66 has a ball track 80 formed across the entire width of the base so that a ball 82 may freely travel from gong to gong.

A permanent magnet 84 is mounted to the base 66 in a manner similar to the mounting of the magnet in FIG. 2, said magnet being disposed within a nest 86 and being urged in two directions by spring members 88 and 89. A notch 90 is provided for adjusting the position of the magnet as in the embodiment of FIG. 2

An electromagnet 92 is disposed opposite the permanent magnet 84 and includes a bobbin 94, a winding 96, connecting wires 98 and U-shaped core laminations 100.

The double gong ringer as shown in FIG. 7 is assembled in a manner similar to that of the single gong ringer and is adjusted for sensitivity and bell tap suppression in a similar manner.

The above-described invention provides a telephone ringer that has only one moving operational part, the steel ball. It is therefore significantly less complex to assemble. Adjustments are accomplished by merely rotating one or two gongs and positioning the permanent magnet. The ringer is small, light weight and much less expensive than prior art devices. One significant improvement of the ringer is the suppression of bell tap using a technique that is polarity insensitive.

While different embodiments of the invention were described, it is to be understood that these were for illustrative purposes only. Modifications could be made by those skilled in the art while still employing the spirit of the invention. Accordingly, the invention is not to be regarded as limited to the embodiment disclosed herein, but is to be limited only as defined by the appended claims.

What is claimed is:

1. A telephone ringer assembly, comprising:
 a housing;
 a gong mounted to said housing;
 means mounted to said housing for establishing a fixed magnetic field adjacent said gong;
 means mounted to said housing for selectively establishing an alternating magnetic field for modulating said fixed magnetic field;
 a moveable armature disposed in said fixed magnetic field, said armature being positioned a predetermined distance from said gong by said fixed magnetic field and being selectively driven in alternating opposite directions towards and away from said gong by said alternating magnetic field, whereby the armature alternately strikes said gong; and
 means for positionally adjusting said means for establishing a fixed magnetic field in a direction parallel to the direction of travel of the armature, whereby the strength of the alternating magnetic field needed to drive the armature to strike the gong can be varied by varying the position of the means for establishing a fixed magnetic field.

2. A ringer assembly as described in claim 1, wherein said means for establishing a fixed magnetic field comprises a permanent magnet.

3. A ringer assembly as described in claim 1, wherein the means for selectively establishing an alternating magnetic field comprises an electromagnet selectively excitable by a ringing signal.

4. A ringer assembly as described in claim 1, wherein the means for establishing a fixed magnetic field comprises a permanent magnet having a magnetic axis perpendicular to the travel of the moveable armature and said means for selectively establishing an alternating magnetic field comprises an electromagnet having a U-shaped core with the ends of the core positioned along a line parallel to the travel of the armature.

5. A ringer assembly as described in claim 4, wherein the permanent magnet positions the moveable armature to a position along its path of travel between the positions of the ends of the U-shaped core of the electromagnet.

6. A ringer assembly as described in claim 1, wherein the moveable armature comprises a ball.

7. A ringer assembly as described in claim 1, additionally comprising means for limiting the movement of said moveable armature, thereby providing a volume control.

8. A ringer assembly as described in claim 1, additionally comprising another gong mounted to said housing at a position relative to the moveable armature opposite from the other gong.

9. A ringer assembly as described in claim 1, wherein the means for establishing a fixed magnetic field comprises a permanent magnet and said means for adjusting the means for establishing a fixed magnetic field comprises:
 spring means for biasing said permanent magnet into a first location;

means for urging said magnet to a second location; and means for locking said magnet into said second location.

10. A ringer assembly as described in claim 9, wherein said means for urging the permanent magnet into a second location comprises a set screw.

11. A ringer assembly as described in claim 9, wherein the means for urging the permanent magnet into said second location comprises a wedge member driven by a set screw.

12. A telephone ringer assembly, comprising:

a gong, an armature disposed adjacent said gong and being freely moveable towards and away from said gong and adapted to strike said gong to produce a sound;

a magnetic armature control means for magnetically positioning said armature relative to said gong and for selectively driving said armature into said gong.

13. A ringer assembly as described in claim 12, wherein said armature comprises a ball.

14. A ringer assembly as described in claim 12, wherein said magnetic armature control means comprises a permanent magnet adjustably positioned relative to said gong for adjusting the position of said armature and an electromagnet for selectively modulating a magnetic field established by said permanent magnet to alternately drive said armature to and away from said gong.

15. A telephone ringer assembly, comprising:

a gong;

means for establishing a permanent magnetic field adjacent said gong;

means for selectively establishing an alternating magnetic field for modulating said permanent magnetic field;

a freely moveable armature disposed in said permanent magnetic field, said armature being positioned a predetermined distance from said gong by said permanent magnetic field and being selectively driven in alternating opposite directions towards and away from said gong by said alternating magnetic field, whereby the armature alternately strikes said gong; and means for adjusting the relative positions of said means for establishing a permanent magnetic field and said means for selectively establishing an alternating magnetic field, whereby the permanent magnetic field may be modified by adjusting said relative positions causing the position of the armature relative to the gong to be varied to change the strength of the alternating magnetic field needed to drive the armature to strike the gong.

* * * * *